United States Patent
Yamanaka

[11] Patent Number: 5,872,759
[45] Date of Patent: Feb. 16, 1999

[54] PHOTODETECTOR WITH REGIONS TO DETECT REFLECTED LIGHT PASS THROUGH CENTRAL PORTION AND NON-CENTRAL PORTION OF AN OBJECTIVE LENS

[75] Inventor: Yutaka Yamanaka, Tokyo, Japan

[73] Assignee: NEC Corporation, Tokyo, Japan

[21] Appl. No.: 800,855

[22] Filed: Feb. 14, 1997

[30] Foreign Application Priority Data

Feb. 15, 1996 [JP] Japan ................................ 8-027590

[51] Int. Cl.[6] ......................................................... G11B 7/00
[52] U.S. Cl. ................... 369/112; 369/44.23; 369/44.41; 369/94
[58] Field of Search .................. 369/112, 44.23, 369/44.24, 44.41, 109, 103, 118, 120, 94

[56] References Cited

U.S. PATENT DOCUMENTS

| | | | |
|---|---|---|---|
| 4,897,828 | 1/1990 | Yoshitoshi et al. | 369/46 |
| 4,945,529 | 7/1990 | Ono et al. | 369/109 |
| 5,111,448 | 5/1992 | Komma et al. | 369/44.23 |
| 5,511,059 | 4/1996 | Brazas, Jr. | 369/109 |
| 5,659,533 | 8/1997 | Chen et al. | 369/112 |

FOREIGN PATENT DOCUMENTS

| | | |
|---|---|---|
| 731458 | 9/1996 | European Pat. Off. . |
| 3913229 | 3/1990 | Germany . |
| 5-197999 | 8/1993 | Japan . |
| 7-98431 | 4/1995 | Japan . |
| 9-120572 | 5/1997 | Japan . |

OTHER PUBLICATIONS

*Patent Abstracts of Japan*, vol. 018, No. 587 (P–1824), Nov. 10,1994 & JP 06 215406 A, Aug. 5, 1994.
*Patent Abstracts of Japan*, vol. 18, No. 655, (P–1844), Dec. 15, 1994 & JP 06 259804 A, Sep. 16, 1994.
*Patent Abstracts of Japan*, vol. 9, No. 308 (P–410), Dec. 4, 1985 & JP 60 138748 A, Jul. 23, 1985.
*Patent Abstracts of Japan*, vol. 16, No. 167 (P–1342), Apr. 22, 1992 & JP 04 014626 A, Jan. 20, 1992.
Y. Komma, et al., "Dual Focus Optical Head for 0.6 mm and 1.2 mm Disks", Optical Reviews, vol. 1, No. 1, (1994), pp. 27–29.

*Primary Examiner*—Tod R. Swann
*Assistant Examiner*—Kim-Kwok Chu
*Attorney, Agent, or Firm*—Ostrolenk, Faber Gerb & Soffen, LLP

[57] ABSTRACT

There is provided an optical head including (a) a laser source for emitting a light, (b) an objective lens for focusing the light onto a plane of an optical recording medium, (c) a photodetector including a first light-receiving region for receiving a light reflected from the optical recording medium and passing through a central portion of the objective lens and a second light-receiving region for receiving a light reflected from the optical recording medium and passing through a non-central portion of the objective lens, and a device for selecting one of an output signal transmitted from the first light-receiving region and a sum of output signals transmitted from the first and second light-receiving regions. The optical head may further include a holographic optical element disposed in an optical path between the laser source and the objective lens for separating a first reflected light reflected from the optical recording medium and passing through a central portion of the objective lens and a second reflected light reflected from the optical recording medium and passing through a non-central portion of the objective lens from each other, in which case the photodetector includes a first light-receiving region for receiving the first reflected light and a second light-receiving region for receiving the second reflected light. The above mentioned optical head makes it possible to reproduce data recorded in an optical disk having different substrate width with smaller decrease in a light quantity.

24 Claims, 6 Drawing Sheets

PHOTODETECTOR WITH REGIONS TO DETECT REFLECTED LIGHT PASS THROUGH CENTRAL PORTION AND NON-CENTRAL PORTION OF AN OBJECTIVE LENS

CROSS-REFERENCES TO RELATED APPLICATIONS

This application claims the benefit of Japanese Patent Application No. 8-27590, filed on Feb. 15, 1996, the disclosure of which, including the specification, claims, drawings and summary, is incorporated herein by reference in its entirety.

BACKGROUND OF THE INVENTION

1. Field of the Invention

The invention relates to an optical head, and more particularly to an optical head recording data signals to and reproducing recorded data out of an optical recording medium such as a compact disk including substrates having different thicknesses.

2. Description of the Related Art

A widely used optical disk includes an optical head which transmits a light through a transparent substrate to thereby form a micro-spot on a plane of a recording medium in order to protect the plane fabricated in micron-order.

In such a conventional optical head, a light emitted from a laser source inside the optical head is transmitted as a converging beam through a transparent substrate comprising a parallel plate of an optical disk. Thus, the beam is caused to have wave aberration which is dependent on a thickness of the parallel plate through which the beam has passed. Herein, wave aberration indicates a gap between an equiphase of a converging beam and a spherical plane. A great gap causes a converging spot to expand beyond the diffraction limit, resulting in that it is impossible to obtain good data-reproduction performance. Hence, a lens is designed to compensate for the wave aberration in an optical head system in order to form a micro-spot in the vicinity of the diffraction limit on a plane of a recording medium.

In general, an optical disk is designed to have a different thickness in accordance with what it is applied to. The compensation for the above mentioned wave aberration varies in dependence on a thickness of an optical disk. Hence, a conventional optical head has a problem that it can reproduce only data recorded in an optical disk having a specific thickness.

There has been suggested another optical head which utilizes a transmitted zero order light and a +1st order diffracted light derived from a holographic optical element (HOE) in order to be able to use two disks having different thicknesses (Y. Komma, S. Nishino and S. Mizuno, "Dual Focus Optical Head for 0.6 mm and 1.2 mm Disks", Optical Review, Vol. 1, No. 1, 1994, pp. 27–29).

The suggested optical head is partially illustrated in FIG. 1. In the illustrated optical head, a beam emitted from a laser source (not illustrated) passes through a compensation holographic optical element 20 and is focused onto both a first optical disk 5 having a thickness of 0.6 mm and a second optical disk 6 having a thickness of 1.2 mm by means of an objective lens 4. Lights reflected at the first and second optical disks 5 and 6 pass through the objective lens 4 and then the compensation holographic optical element 20, and are received in a photodetector (not illustrated).

The objective lens 4 is designed to be adapted for the first optical disk 5 having a thickness of 0.6 mm and reproduce data-recorded signals derived from the first optical disk 5 by means of a transmitted zero order light derived from the compensation holographic optical element 20 and having no phase changes. In order to adapt for the second optical disk 6 having a thickness of 1.2 mm, the compensation holographic optical element 20 is designed to have a grating to emit a +1st order diffracted light for compensating for aberration still existing in a light transmitting through the objective lens 4 due to a difference in a thickness between the first and second optical disks.

However, since a beam is to be divided into pieces by the compensation holographic optical element 20 in the above mentioned conventional optical head, the conventional head poses a problem that it is not avoidable that an efficiency of utilizing a light is reduced, and accordingly an amount of light is significantly reduced. For instance, provided that a division ratio is 50% for a transmitted zero order light and also 50% for a +1st order diffracted light, the efficiency of a light is merely 25%, because the light passes through the compensation holographic optical element 20 twice in outgoing and incoming paths.

SUMMARY OF THE INVENTION

In view of the foregoing problems, it is an object of the present invention to provide an optical head capable of recording data onto and reproducing data out of optical disks having different thicknesses with smaller reduction in an amount of a light than a conventional optical head.

There is provided an optical head including (a) a laser source for emitting a light, (b) an objective lens for focusing the light onto a plane of an optical recording medium, (c) a photodetector including a first light-receiving region for receiving a light reflected from the optical recording medium and passing through a central portion of the objective lens and a second light-receiving region for receiving a light reflected from the optical recording medium and passing through a non-central portion of the objective lens, and (d) a selector for selecting one of an output signal transmitted from the first light-receiving region and a sum of output signals transmitted from the first and second light-receiving regions in accordance with a thickness of the optical recording medium.

For instance, the first light-receiving region of the photodetector is defined as a region inside a closed boundary, and the second light-receiving region of the photodetector is defined as a region outside the closed boundary. Herein, the closed boundary may be a circle or an ellipse in shape. When the closed boundary is selected to an ellipse, the ellipse preferably has a major axis extending in a direction in which the light transmitted from the laser source moves.

The optical head may further include a beam splitter disposed in an optical path between the laser source and the objective lens for introducing a light reflected from the optical recording medium into the photodetector.

The optical head may further include an astigmatism generating element disposed in an optical path between the beam splitter and the photodetector, a light-receiving region of the photodetector being divided into four sections, in which case the four sections of the light-receiving region are preferably equal in area to one another. For instance, the astigmatism generating element is comprised of a parallel plate.

The optical head may further include a diffraction element disposed in an optical path between the laser source and the beam splitter. A light-receiving region of the photodetector is divided into three sections. It is preferable that these three sections are equal in area to one another.

There is further provided an optical head including (a) a laser source for emitting a light, (b) an objective lens for focusing the light onto a plane of an optical recording medium, (c) a holographic optical element disposed in an optical path between the laser source and the objective lens for separating a first reflection light reflected from the optical recording medium and passing through a central portion of the objective lens and a second reflection light reflected from the optical recording medium and passing through a non-central portion of the objective lens from each other, (d) a photodetector including a first light-receiving region for receiving the first reflection light and a second light-receiving region for receiving the second reflection light, and (e) a selector for selecting one of an output signal transmitted from the first light-receiving region and a sum of output signals transmitted from the first and second light-receiving regions.

In a preferred embodiment, the first light-receiving region of the photodetector is comprised of two regions each of which is divided into two sections, and the second light-receiving region of the photodetector is comprised of a single region, the two regions and the single region being disposed in a line.

The optical head may further include a diffraction element disposed in an optical path between the laser source and the holographic optical element, in which case a light-receiving region of the photodetector preferably includes two first regions each of which is divided into two sections and which are horizontally, adjacently disposed, two second regions each disposed above and below the first regions, and third three regions vertically disposed in a line adjacent to the first and second regions.

The holographic optical element may have a first area through which the first reflection light passes and a second area through which the second reflection light passes, the first area including two sections defined by dividing a closed area into two areas, the second area being defined as an area outside the closed area. For instance, the first area is a circle in shape, and the two sections are defined by dividing the first area with a line passing a center thereof. The first area is preferably centrally located in the second area.

In accordance with the present invention, a first light reflected from an optical recording medium and passing through a central portion of the objective lens is received at the first light-receiving region of the photodetector, and a second light reflected from an optical recording medium and passing through a peripheral portion of the objective lens is received at the second light-receiving region of the photodetector. Then, there is selectively transmitted either an output signal from the first light-receiving region or a sum of output signals from the first and second light-receiving regions in accordance with a thickness of the optical recording medium.

Thus, it is possible to minimize the reduction in a light utilization efficiency caused by the division of a light into pieces. The minimized reduction in a light utilization efficiency in turn advantageously decreases the reduction in an amount of a light relative to a conventional optical head. In addition, since two optical disks having different thicknesses can be used only by dividing a light-receiving portion of a photodetector into several sections in the present invention, it is now possible to fabricate the inventive optical head with an increase in the number of optical elements being reduced. Furthermore, the holographic optical element makes it possible to independently introduce lights reflected from optical disks and passing through central and peripheral portions of an objective lens into a photodetector, and hence two optical disks having different thicknesses are allowed to use with a minor change in existing optical heads.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 2:
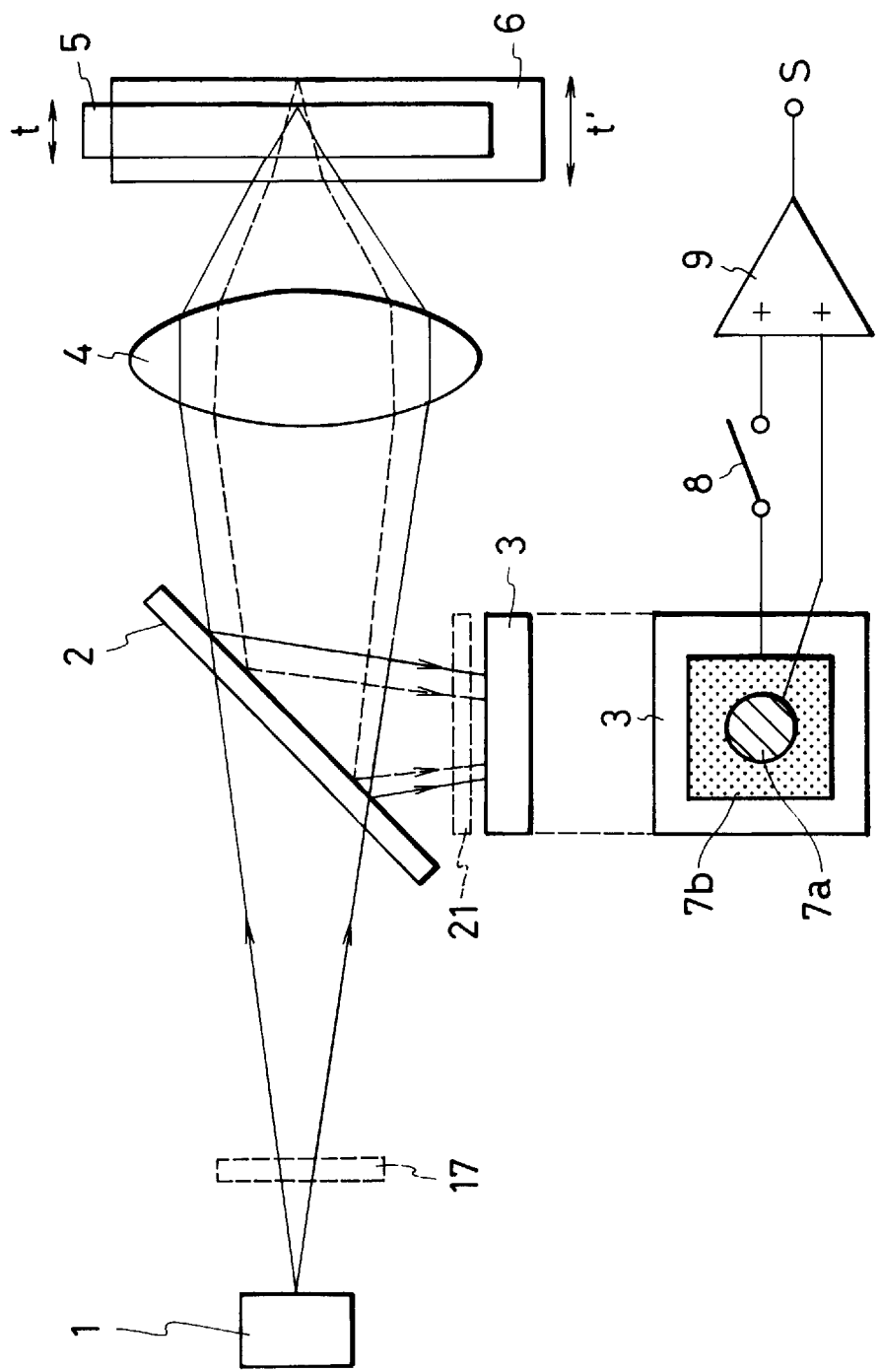
FIG. 2 is a schematic view illustrating an optical head made in accordance with the first embodiment of the present invention.

FIG. 2 illustrates an optical head made in accordance with the first embodiment, which includes a laser source 1, a beam splitter 2, a photodetector 3, an objective lens 4, a switch 8, and an adder 9. There are disposed a first optical disk 5 having a thickness of 0.6 mm and a second optical disk having a thickness of 1.2 mm in facing relation to the objective lens 4.

In operation, a light emitted from the laser source 1 passes through the beam splitter 2, and is focused onto a recording plane of the first optical disk 5 or the second optical disk 6 by means of the objective lens 4. A light reflected at the first or second optical disk 5 or 6 passes through the objective lens 4 again and is reflected at the beam splitter 2 to thereby be introduced into and received in the photodetector 3.

The photodetector 3 has a light-receiving plane divided into two light-receiving regions: a first light-receiving region 7a which is circular in shape, and a second light-receiving region 7b which is rectangular in shape and wholly surrounds the first light-receiving region 7a. The first and second light-receiving regions 7a and 7b receive a light, and transform the received light into a current. The first light-receiving region 7a is in direct communication to the adder 9, whereas the second light-receiving region 7b is in indirect communication to the adder 9, that is, the switch 8 is provided between the second light-receiving region, 7b and the adder 9. When the first optical 0.6 mm-disk 5 is to be reproduced, the switch 8 is made closed or turned on. As a result, electric signals representing a current produced by photoelectric transfer in the first and second light-receiving regions 7a and 7b are summed in the adder 9, and the adder 9 outputs a sum of the signals as a reproduction signal S. Thus, the reflected light passing through the objective lens 4 are wholly used to produce the reproduction signal S. This is because a light having passed through the objective lens 4 is converged into a focus on a recording plane of the first optical disk 5 after passing through a substrate of the first optical disk 5.

When the second optical 1.2 mm-disk 6 is to be reproduced, the switch 8 is made open or turned off. As a result, an electric signal representing a current produced by photoelectric transfer only in the first light-receiving region 7a is transmitted to the adder 9, which outputs a reproduction signal S accordingly. This is because, among lights having passed through the objective lens 4 and directing to the second optical disk 6, a light having passed through a central portion of the objective lens 4 forms an image on a recording plane of the second optical disk 6 which is more remote from the objective lens 4 than a recording plane of the first optical disk 5 on which a light having passed through a peripheral portion of the objective lens 4 forms an image. Thus, the reproduction signal S is derived only from a light having passed through a central portion of the objective lens 4 among lights reflected from the second optical disk 6 and passing through the objective lens 4.

As explained so far, the first embodiment makes it possible to use two optical disk having different thicknesses only by dividing a light-receiving plane of the photodetector 3 into several regions with a slight increase in the number of optical elements. In addition, since the division of a light is carried out only by means of a beam splitter which is included even in a conventional optical head, the reduction in an amount of a light is smaller than that of the conventional optical head illustrated in FIG. 1 employing the compensation holographic optical element 20.

Figure 3:
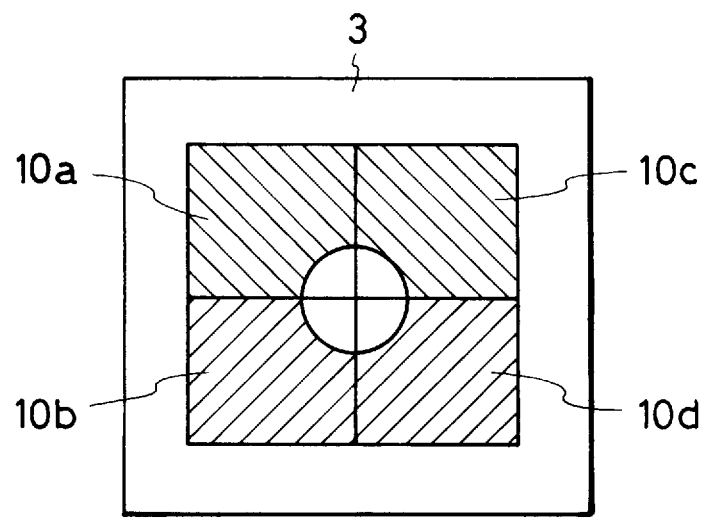
FIG. 3 is a plan view illustrating another photodetector to be used in the optical head illustrated in FIG. 2.

In the above mentioned first embodiment, there may be disposed an astigmatism generating element such as a parallel plate 21 (illustrated with a broken line in FIG. 2) in an optical path between the beam splitter 2 and the photodetector 3, in which case, a light-receiving plane of the photodetector 3 is preferably divided into four sections. 10a, 10b, 10c and 10d, as illustrated in FIG. 3. Specifically, the four sections 10a to 10d are square in shape and defined by two lines passing a center of the photodetector 3 and perpendicularly intersecting with each other. Namely, the four sections 10a to 10d are equal in area to one another. The division of the photodetector 3 into the four sections ensures to obtain focusing error signals by astigmatism and/or tracking error signals by push-pull or heterodyne.

Figure 4:
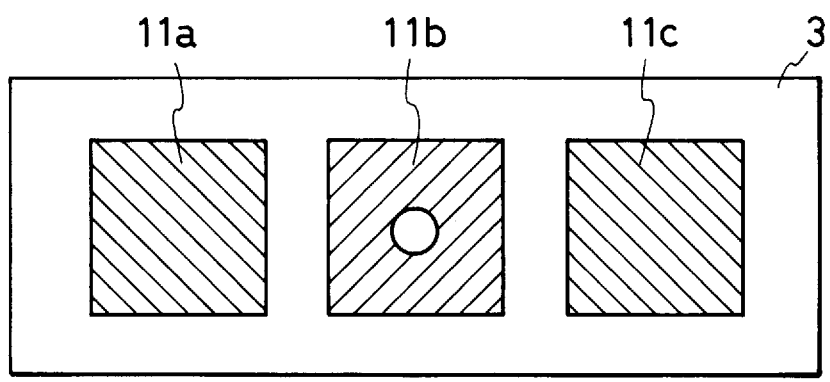
FIG. 4 is a plan view illustrating still another photodetector to be used in the optical head illustrated in FIG. 2.

There may be disposed a diffraction element 17 in an optical path between the laser source 1 and the beam splitter 2, in which case, a light-receiving plane of the photodetector 3 is preferably divided into three sections 11a, 11b and 11c, as illustrated in FIG. 4. The sections 11a to 11c are all square in shape and equal in area, and are arranged horizontally in a line. This arrangement makes it relatively easy to have tracking error signals by three beams technique.

In addition, there may be employed a combination of a collimate lens and an objective lens for introducing a laser beam emitted from the laser source 1 to the first or second optical disks 5 or 6. As an alternative, there may be employed a polarized beam splitter and a quarter wavelength plate for increasing an amount of a reflected light.

Figure 5:
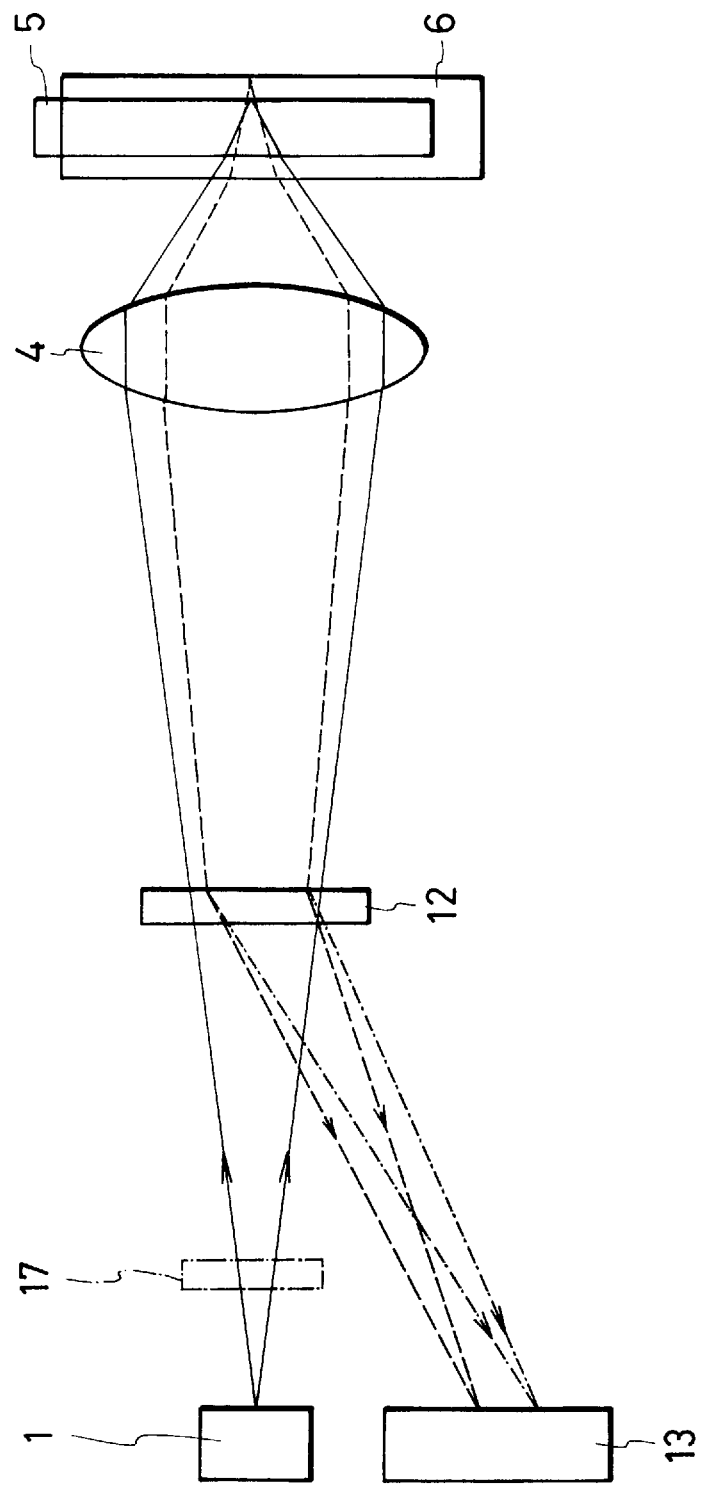
FIG. 5 is a schematic view illustrating an optical head made in accordance with the second embodiment of the present invention.

FIG. 5 illustrates an optical head made in accordance with the second embodiment of the present invention. Parts or elements corresponding to those of the first embodiment illustrated in FIG. 2 have been provided with the same reference numerals. The illustrated optical head includes a laser source 1, a objective lens 4, a holographic optical element 12, and a photodetector 13.

Figure 6A:
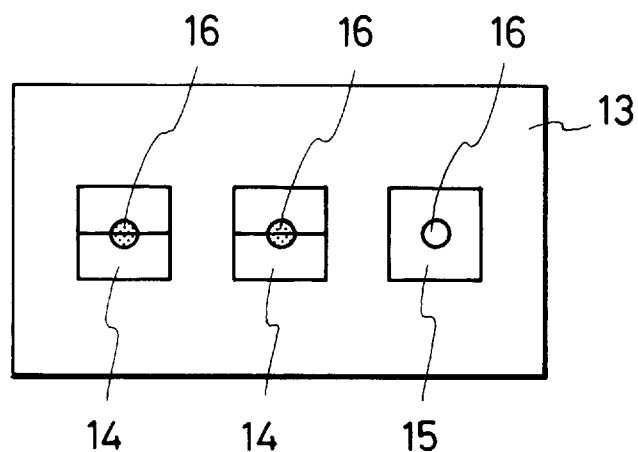
FIG. 6A is a plan view illustrating an example of a photodetector to be used in the optical head illustrated in FIG. 5.

In the second embodiment, a first light-receiving region of the photodetector 13 is comprised of two regions 14 each of which is divided into two sections, and a second light-receiving region of the photodetector 13 is comprised of a single region 15, as illustrated in FIG. 6A. These two regions 14 and the single region 15 are disposed horizontally in a line in the photodetector 3. The regions 14 and 15 are square in shape, and receive a light at a central, circular portion 16 thereof.

Figure 6B:
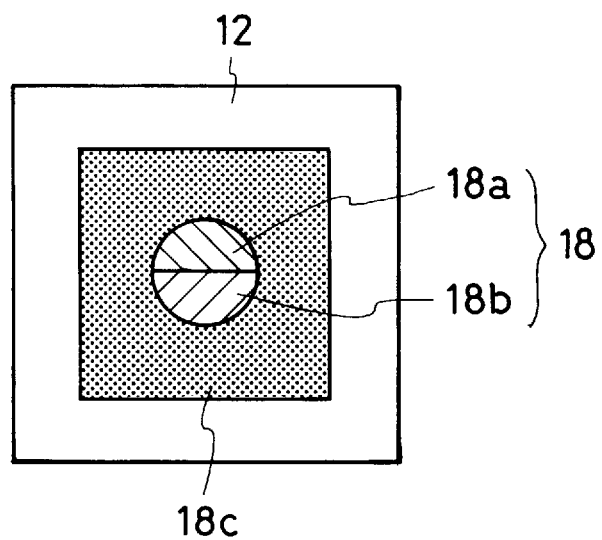
FIG. 6B is a plan view illustrating an example of a holographic optical element to be used in the optical head illustrated in FIG. 5.

The holographic optical element 12 has a first area 18 and a second area 18c, as illustrated in FIG. 6B. The first area 18 is circular in shape, and consists of two half-circular sections 18a and 18b defined by dividing the circular first area 18 with a line passing a center of the circular first area 18. The second area 18c is square in shape, and wholly surrounds the first area 18 so that the first area 18 is centrally located in the second area 18c.

In operation, a laser beam emitted from the laser source 1 passes through the holographic optical element 12 and is focused on a recording plane of the first or second optical disk 5 or 6 by means of the objective lens 4. The beam reflected at the first or second optical disk 5 or 6 passes through the objective lens 4 again, and is diffracted by the holographic optical element 12 to thereby be introduced into the photodetector 13. The beam received in the photodetector 13 is transformed into a current, namely photoelectric transfer is carried out.

The division of the holographic optical element 12 into the first and second areas 18 and 18c provides the same advantageous effects as the effects provided by the division of a light-receiving plane of the photodetector 3 illustrated in FIG. 2. In the second embodiment, the circular first area 18 of the holographic optical element 12 is further divided into the two half-circular area 18a and 18b, as illustrated in FIG. 6B, to thereby detect focusing error signals. The two light-receiving regions 14 of the photodetector 13 each divided into two sections receive the light diffracted at the first area 18 of the holographic optical element 12 consisting of the half-circular sections 18a and 18b, and the single light-receiving region 15 of the photodetector 13 receives the light diffracted at the square, second area 18c of the holographic optical element 12.

The electric signals produced by photoelectric transfer carried out in the two light-receiving regions 14 are output signals representing a beam having passed through a central portion of the objective lens 4, whereas the electric signals produced by photoelectric transfer carried out in the single light-receiving region 15 are output signals representing a beam having passed through a peripheral portion of the objective lens 4. When the first optical 0.6 mm-disk 5 is to be reproduced, there is obtained an output signal representing a sum of outputs derived from the regions 14 and 15 for the same reason as mentioned in the first embodiment.

When the second optical 1.2 mm-disk 6 is to be reproduced, for the same reason as mentioned in the first embodiment, there is obtained a reproduction signal derived only from the reflected light having passed through a central portion of the objective lens 4 and having been diffracted at the half-circular sections 18a and 18b located at the center of the holographic optical element 12 illustrated in FIG. 6B among all of the lights having been reflected from the second optical disk 6 and having passed through the objective lens 4. Thus, the obtained output signal is equal to a sum of output signals derived from the two half-divided light-receiving regions 14. In addition, it is also possible to obtain focusing error signals based on output signals produced by the two half-divided light-receiving regions 14 by a principle of knife edge.

Figure 1:
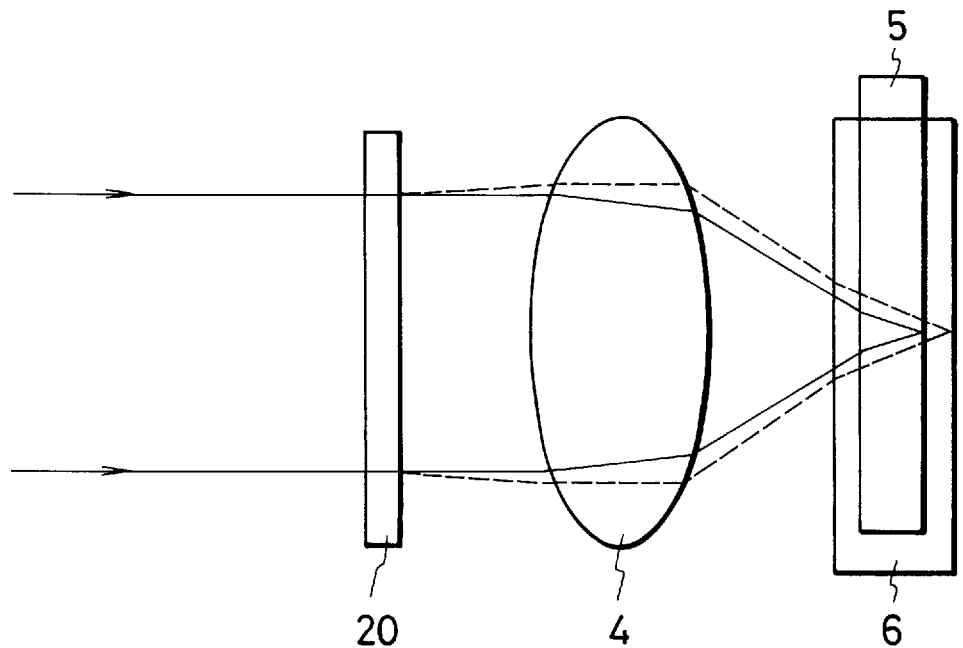
FIG. 1 is a schematic view partially illustrating a conventional optical head.

The holographic optical element 12 employed in the second embodiment is an optical-part similar to a beam splitter and is used for separating a beam directed from a laser source to an objective lens from a beam reflected at an optical disk and passing through an objective lens, and further for directing the latter light to a photodetector. That is, the holographic optical element 12 is different from the compensation holographic optical element 20 used in a conventional optical head as illustrated in FIG. 1 for always separating a beam directed to an optical disk into two pieces, and hence the optical head in accordance with the second embodiment enhances an efficiency of utilizing a beam relative to a conventional optical head.

Thus, the second embodiment provides an advantage of being capable of using two optical disks having different thicknesses with a small drop in an amount of a light by dividing a light-receiving plane of the photodetector 13 into a plurality of sections and providing the holographic optical element 12.

Figure 7:
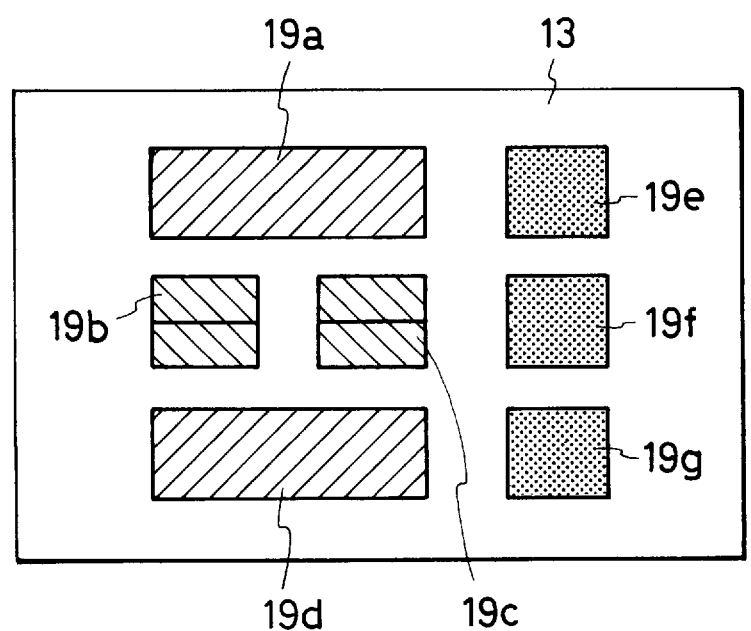
FIG. 7 is a plan view illustrating another example of a photodetector to be used in the optical head illustrated in FIG. 5.

As illustrated in FIG. 5 with a broken line, there may be disposed a diffraction element 17 in an optical path between the laser source 1 and the holographic optical element 12, in which case, a light-receiving region of the photodetector 13 is preferably designed to include two first regions 19b and 19c each of which is divided into two sections, two second regions 19a and 19d, and three third regions 19e, 19f and 19g. The first regions 19b and 19c are horizontally, adjacently disposed. The second regions 19a and 19d are disposed above and below the first regions 19b and 19c, respectively. The third regions 19e, 19f and 19g are vertically disposed in a line and adjacent to the first and second regions 19b, 19c and 19a, 19d. This arrangement makes it easy to obtain tracking error signals by three beams technique. In accordance with the photodetector illustrated in FIG. 7, it is relatively easy to separate a sub-beam for detecting tracking errors into two portions each of which is to pass through a central portion and a peripheral portion of the objective lens 4, respectively.

As mentioned so far, the holographic optical element 12 can be readily combined with various means for detecting errors.

In the above mentioned first and second embodiments, a boundary between the first and second light-receiving regions is shaped to be a circle. However, when objective lenses are moved in parallel for tracking movement, a center of a beam also moves in a light-receiving plane, resulting in that there arises a problem that the reproduction signal characteristics are varied because of a beam displacement. In order to solve this problem, a boundary between the first and second light-receiving regions may be shaped to be an ellipse having a major axis extending in a direction in which the beam moves. Such an elliptical boundary not only solves the problem, but also provides the same advantageous effects as those obtained by the first and second embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An optical head comprising:
    an objective lens for focusing a light onto planes of first and second optical recording mediums, said first and second optical recording mediums having different thicknesses;
    a photodetector including a first light-receiving region for receiving a light reflected from said first and second optical recording mediums and passing through a central portion of said objective lens and a second light-receiving region for receiving a light reflected from said first optical recording medium and passing through a non-central portion of said objective lens; and
    means for selecting one of an output signal transmitted from said first light-receiving region and a sum of output signals transmitted from said first and second light-receiving regions in accordance with the thickness of a selected one of said first and second optical recording mediums.

2. The optical head as set forth in claim 1, wherein said first light-receiving region of said photodetector is defined as a region inside a closed boundary and said second light-receiving region of said photodetector is defined as a region outside said closed boundary.

3. The optical head as set forth in claim 2, wherein said closed boundary is a circle in shape.

4. The optical head as set forth in claim 2, wherein said closed boundary is an ellipse in shape.

5. The optical head as set forth in claim 4, wherein said light is emitted from a laser source and said closed boundary has a major axis extending in a direction at which said light emitted from said laser source moves as it travels through said objective lens onto said first and second recording mediums.

6. The optical head as set forth in claim 1, wherein said light is emitted from a laser source and said optical head further comprises a beam splitter disposed in an optical path between said laser source and said objective lens for introducing the light reflected from said first and second optical recording mediums into said photodetector.

7. The optical head as set forth in claim 6 further comprising an astigmatism generating element disposed in an optical path between said beam splitter and said photodetector, a light-receiving region of said photodetector being divided into four sections.

8. The optical head as set forth in claim 7, wherein said astigmatism generating element is a parallel plate.

9. The optical head as set forth in claim 7, wherein said four sections of said light-receiving region are equal in area to one another.

10. The optical head as set forth in claim 6 further comprising a diffraction element disposed in an optical path between said laser source and said beam splitter, a light-receiving region of said photodetector being divided into three sections.

11. The optical head as set forth in claim 10, wherein said three sections are equal in area to one another.

12. The optical head as set forth in claim 1, wherein said second optical recording medium has a greater thickness than that of said first optical recording medium.

13. An optical head comprising:
    an objective lens for focusing said light onto planes of first and second optical recording mediums, said first and second optical recording mediums having different thicknesses;

a holographic optical element disposed in an optical path between a laser source and said objective lens for separating a first reflection light reflected from said first and second optical recording mediums and passing through a central portion of said objective lens and a second reflection light reflected from said first optical recording medium and passing through a non-central portion of said objective lens;

a photodetector including a first light-receiving region for receiving said first reflection light and a second light-receiving region for receiving said second reflection light, and means for selecting one of an output signal transmitted from said first light-receiving region and a sum of output signals transmitted from said first and second light-receiving regions in accordance with the thickness of a selected one of said first and second optical recording mediums.

14. The optical head as set forth in claim 13, wherein said first light-receiving region of said photodetector is defined as a region inside a closed boundary and said second light-receiving region of said photodetector is defined as a region outside said closed boundary.

15. The optical head as set forth in claim 14, wherein said closed boundary is an ellipse in shape.

16. The optical head as set forth in claim 15, wherein said light is emitted from a laser source and said closed boundary has a major axis extending in a direction in which said light emitted from said laser source moves as it travels from said laser source through said objective lens onto said first and second recording mediums.

17. The optical head as set forth in claim 14, wherein said closed boundary is a circle in shape.

18. The optical head as set forth in claim 13 further comprising a diffraction element disposed in an optical path between a laser source and said holographic optical element.

19. The optical head as set forth in claim 18, wherein a light-receiving region of said photodetector includes two first regions each of which is divided into two sections and which are horizontally, adjacently disposed, two second regions each disposed above and below said first regions, and third three regions vertically disposed in a line adjacent to said first and second regions.

20. The optical head as set forth in claim 13, wherein said holographic optical element has a first area through which said first reflection light passes and a second area through which said second reflection light passes, said first area including two sections defined by dividing a closed area into two areas, said second area being defined as an area outside said closed area.

21. The optical head as set forth in claim 20, wherein said first area is a circle in shape, and said two sections are defined by dividing said first area with a line passing a center thereof.

22. The optical head as set forth in claim 21, wherein said first area is centrally located in said second area.

23. The optical head as set forth in claim 13, wherein said first light-receiving region of said photodetector is comprised of two regions each of which is divided into two sections, and said second light-receiving region of said photodetector is comprised of a single region, said two regions and said single region being disposed in a line.

24. The optical head as set forth in claim 13, wherein said second optical recording medium has a greater thickness than that of said first optical recording medium.

* * * * *